3,292,053
ANODIZED-FILM DIELECTRIC CAPACITOR HAVING COLLOIDAL GRAPHITE COATING ON THE FILM
Aniello DiGiacomo, Orange, N.J., assignor to General Instrument Corporation, Newark, N.J., a corporation of New Jersey
Filed June 21, 1963, Ser. No. 289,552
10 Claims. (Cl. 317—230)

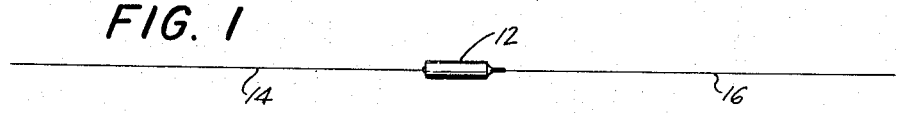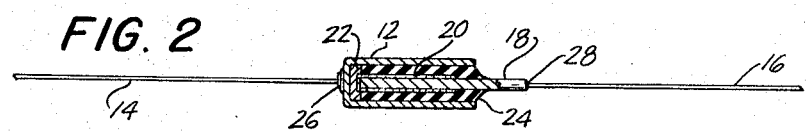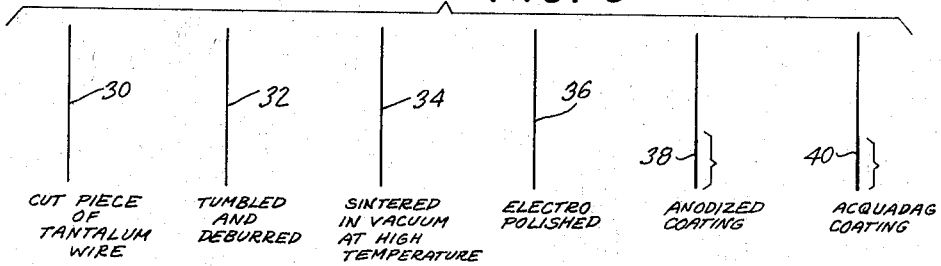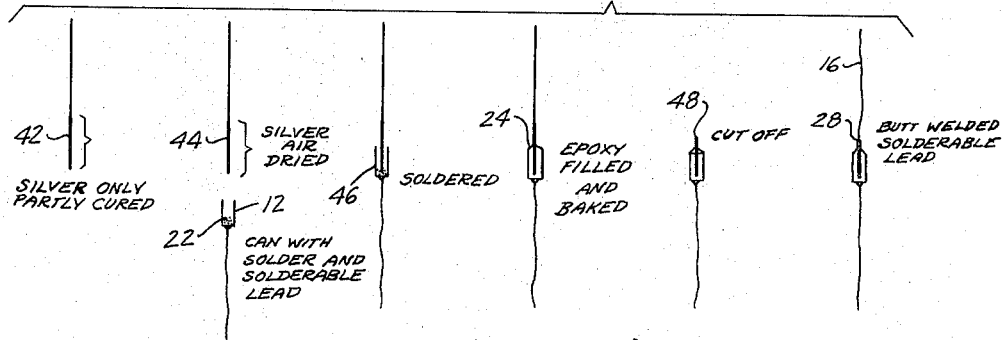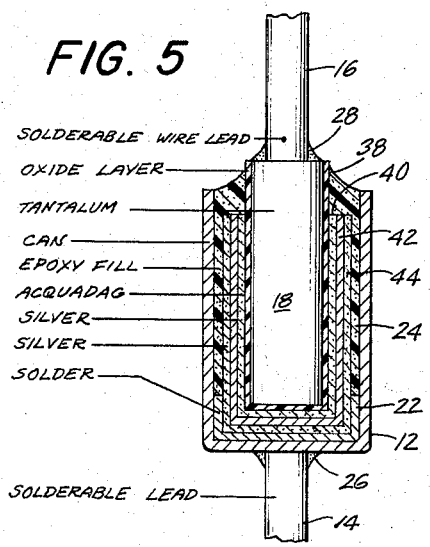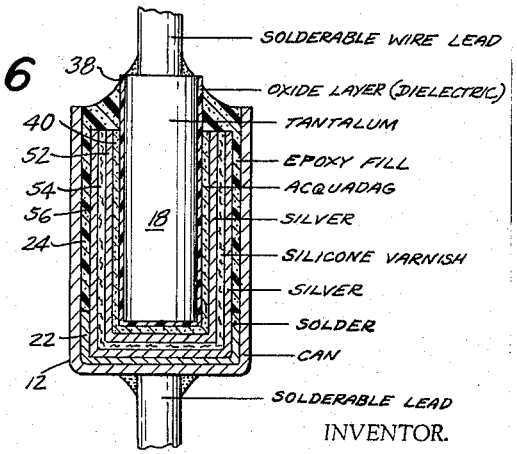
INVENTOR.
ANIELLO DI GIACOMO
ATTORNEYS United States Patent Office 3,292,053
Patented Dec. 13, 1966

This invention relates to capacitors, and more particularly to discrete microminiature capacitors.

The primary object of the present invention is to provide an improved tiny discrete capacitor, and a method of making the same.

It is known that greatly increased capacitance relative to volume is obtainable in an electrolytic type of capacitor. It is also known to use a thin tantalum wire which is anodized to form a dielectric, which then is coated with manganese oxide acting as a solid electrolyte. This is followed by aquadag and silver, the unit then being soldered in a protective can.

One primary object of the present invention is to improve the characteristics of such capacitors. More specific objects are to raise the rated voltage; to improve the temperature coefficient of capacitance; to decrease the dissipation factor; to decrease the change of dissipation factor with frequency; to reduce the capacitance change with frequency; to increase the operating life; and to increase the reverse potential tolerance. Expressed in a different manner, an object of the present invention is to provide such a capacitor which has improved working characteristics approaching those of the much bulkier mylar or paper capacitors, while retaining the small size of solid tantalum electrolytic capacitors heretofore known.

Another object of the present invention is to provide such a capacitor which has neither liquid nor solid electrolyte, but which has the compactness of an electrolytic capacitor. This eliminates the disadvantage of possible electrolytic ionization.

A further object is to provide several ways to reduce the heat shock of the soldering operation. In one method a silicone varnish is used following a silver coating, and in a closely related method the silicone varnish is used between two coats of silver. In another procedure a layer of aquadag is used following the silver, or again, between two layers of silver. However, in the most preferred method no such non-metallic cushion is employed, and instead I have found that if a first layer of silver is only partly cured, and a second layer of silver is dried without curing, these layers of uncured silver protect the dielectric against heat shock during the subsequent soldering operation. There is some subsequent cure of the silver during the soldering operation, and the entire assembled unit with an epoxy fill is subsequently baked, which further cures the silver.

To accomplish the foregoing general objects, and other more specific objects which will hereinafter appear, my invention resides in the capacitor elements and their relation one to another, as are hereinafter more particularly described in the following specification. The specification is accompanied by drawings in which:

FIG. 1 shows a microminiature capacitor embodying features of the invention;

FIG. 2 is a section through the capacitor drawn to larger scale;

FIG. 3 shows successive steps in the manufacture of the capacitor;

FIG. 4 illustrates additional steps in the manufacture of the capacitor;

FIG. 5 is an enlarged section, not drawn to scale, showing the successive layers of material used; and FIG. 6 is a similar view explanatory of a modified form of the capacitor.

Referring to the drawing, and more particularly to FIG. 1, the body of the microminiature capacitor is shown at 12, its shell or can having a solderable lead 14, and its inner electrode having a solderable lead 16. The specific capacitor shown has a diameter of 0.065" of a length of 0.183", and weighs 0.004 ounce.

The capacitor is shown drawn to larger scale in FIG. 2, referring to which a thin tantalum core or wire 18 is coated with a series of layers collectively designated 20, which will be described in greater detail later. Briefly, there is a dielectric formed by anodizing the tantalum, and counter electrode layers ending with silver. This is protectively housed in a can 12, and is soldered thereto by means of solder indicated at 22. The remainder of the can is filled with an epoxy fill 24. The solderable lead 14 is butt welded to the can 12 at 26, and the solderable lead 16 is butt welded to the electrode 18 at 28. The can here used is made of silver, but other metals may be employed.

Referring now to FIG. 3 a piece of thin tantalum wire 30 is cut to convenient length, say one inch. The resulting needle-like pieces are preliminarily tumbled to debur them and to provide a mechanically smooth and nearly perfect piece of wire, indicated at 32. This is sintered in a vacuum at high temperature to remove impurities, the purified wire being designated 34. In the present case the sintering is done at 2,000° to 2,200° C., in a vacuum of 0.2 micron, for a period from ten to thirty minutes.

For additional mechanical perfection the wire is electro polished, the product then being indicated at 36.

The wire is then treated to form the desired dielectric, which is an oxide of the wire, in this case tantalum pentoxide. This is done by anodizing a suitable part of the length of the wire, and in FIG. 6 it is the lower end portion 38 that has been immersed and anodized. In preferred treatment a 10% solution of hydrogen peroxide is used, at a temperature from 50° to 100° C., and preferably at 80° C. A much higher than usual voltage is applied, specifically from 320 to 375 volts, if the capacitor is to have a rating of say 100 volts. The current flow produced is in a range from 8 to 25 milliamperes per square inch. One advantage of using hydrogen peroxide is that there is no need for multiple thorough washings of the anodized wire, and instead it may be sent along to the next process step directly from the anodizing bath.

However, the wire may be anodized in 10% to 30% phosphoric acid at a temperature from 50° to 100° C., and preferably at 80° C. In such case the voltage is carried up to say 300 volts if the finished capacitor is to have a rating of say 100 volts. In this connection it may be mentioned that heretofore the voltage employed was very much lower.

In accordance with prior practice, after appropriate washing the next step was to apply manganous nitrate and to bake the same to produce manganese dioxide, this being a semiconductor and acting as a solid electrolyte. The resulting capacitor then is polarized or assymetric. The present capacitor also is polarized or assymetric, but no manganese dioxide or other electrolyte is employed, and the reverse potential tolerance is much higher than usual.

The counter electrode has a preliminary film of aquadag illustrated at 40. This provides a nearly molecular contact or very low resistance contact with the dielectric and with a layer of silver next applied. The aquadag is baked at a temperature of 125° to 150° C. for say twenty minutes. The term "aquadag" in this specification is used to mean colloidal graphite.

A first coating of silver is applied over the aquadag, indicated at 42 in FIG. 4. The silver used is a colloidal low-baking-temperature silver paint or suspension. It is only partially cured, and then another coat of silver paint is applied as indicated at 44 in FIG. 4, which latter coat at this stage is not cured at all. As explained later, the purpose is to protect the dielectric or tantalum pentoxide from the heat shock of a soldering operation which is performed later.

To partially cure the layer 42 it is first dried at room temperature for twenty to thirty minutes, and is then heated to 85° C. for twenty to thirty minutes, and then is baked at a low baking temperature of from 100 to 125° C. for twenty to sixty minutes (whereas the usual cure would be at a temperature from 125 to 150° C. for one-half to two hours).

The second film of silver, shown at 44, is simply air dried at room temperature for a period of from two to three hours.

The can shown at 12 is preliminarily provided with a pellet 22 of indium or of solder. The solder used is preferably one which may be worked at a temperature of say 160° to 180° C. The wire is inserted in the can and soldered thereto, as shown at 46 in FIG. 4. The can then is potted or filled with a suitable epoxy fill 24. The can is preferably heated to a temperature of say 60° to 100° C. before being filled with the epoxy material, and is then baked at a temperature of say 60° to 85° C. for a period of from one to two hours, whereupon the temperature is elevated to say 100° to 125° C., and the baking is continued for a period of say six to twelve hours.

During the soldering step shown at 46, and more especially the epoxy filling and baking step shown at 24, the first and second coats of silver are baked as an incident to the other steps.

I have found that the procedure here described leaves the dielectric film (the tantalum pentoxide shown at 38 in FIG. 2) intact and free of pin holes. While I do not wish to be bound to suggested theory, it is my theory that pin holes are produced by heat shock, and that the uncured second layer of silver and the partially cured first layer of silver, help protect the dielectric film from the heat shock which would otherwise result during the soldering operation.

The excess tantalum wire is then cut off as shown at 48 in FIG. 4, and a solderable lead 16 is butt welded at 28 to the inner electrode, thereby completing the capacitor.

Referring now to FIG. 5 of the drawing, this is not drawn to scale, the thicknesses being greatly exaggerated in order to more readily identify the layers. The tantalum core is shown at 18; the tantalum pentoxide dielectric is shown at 38; the aquadag counter-electrode is shown at 40; the first silver layer is shown at 42; the second silver layer is shown at 44; the solder at 22; the can at 12, and the epoxy fill at 24. The solderable lead 14 is welded to the can at 26, and the solderable lead 16 is welded to the core 18 at 28.

I have found that the dielectric may be protected against heat shock by using a non-metallic layer, although the procedure described above is preferred. Referring to FIG. 6, the tantalum core 18 corresponds to that previously described, and similarly has a tantalum pentoxide dielectric 38 formed by anodizing, as previously described. A coating of aquadag 40 is applied as before, and is baked as before at a temperature from 100 to 175° C. for a period of from twenty to thirty minutes.

A layer of silver 52 is applied and is baked. Baking does not cause the damaging heat shock that is caused by soldering. For baking the wire is treated at room temperature for from twenty to thirty minutes, then at 85° C. for twenty to thirty minutes, and then the temperature is elevated to say 125 to 150° C., and the baking is continued for say one-half to two hours.

A coating of silicone varnish 54 is next applied, and this is baked at a temperature of 85° C. for a period of twenty to sixty minutes, and at a temperature of 125° C. for say one hour.

In one form of the invention, the resulting unit may next be soldered; epoxy filled; and baked as previously described. The soldering operation breaks down the silicone varnish and affords electrical contact between the solder 22 and the silver 52. In another form of the invention a second layer of silver is applied, indicated at 56. This is applied over the silicone varnish, and is itself baked in stages as previously described for the first layer 52 of silver. Then the soldering operation proceeds, followed by the epoxy fill, and baking, as previously described. The soldering breaks down the silicone varnish and affords contact from silver 52 to silver 56.

In these two forms of the invention it is believed that the silicone varnish acts as a buffer to protect the dielectric 38 against heat shock.

It is not essential to use silicone varnish as the non-metallic barrier or buffer, and I have successfully used a slightly different procedure in which the silicone varnish is replaced by a layer of aquadag. Again referring to FIG. 6 the first layer 52 of baked silver is followed by a buffer coating of baked aquadag at 54. This is baked like the first layer, that is, 125° to 150° C. for say twenty minutes. This may be followed by a solder puddle 22, or in another variant form of the invention, it may be followed by a second layer 56 of silver, which again is baked as previously described, before the soldering operation. Soldering is followed by an epoxy fill 24, and final baking as previously described.

The solder 22, and epoxy fill 24 apply to all forms described above, that is, using silicone varnish or aquadag at 54, and with or without the second layer 56 of silver.

The new capacitor has some striking advantages and improvements in operating characteristic. One main advantage is that it may be rated at much higher voltage than heretofore available for a dry tantalum capacitor. It may be rated at 125 volts when used at 3000 pf. (picofarad or mmf.). When rated at a lower voltage the capacitance rises, for example to 12,000 pf. at 25 volts, and 25,000 pf. at 5 volts.

Another advantage is an improvment in temperature coefficient of capacitance. The capacitance change from room temperature to an elevated temperature of 125° C. is less than 4%, whereas heretofore it was over 10%. In a change from room temperature downward to a very low temperature of minus 100° C., the capacitance change is less than 4%, instead of being more than 15% as heretofore. These figures for capacitance change are at a rated voltage of 125 volts.

The dissipation factor or loss at room temperature and at 1000 cycles is 0.3% or less, whereas heretofore it was 1% or more. The change of the dissipation factor, with a change of frequency is also greatly reduced. For example at a frequency of one megacycle the change is less than 3%, instead of being more than 30% as heretofore.

The capacitance change with frequency is also reduced. For example at room temperature and at 125 volts, in going from a frequency of a thousand cycles to a million cycles the change in capacitance is less than 2½%, whereas heretofore it was more than 15%.

The operating life is longer, perhaps because there is no ionic conduction such as there is when using an electrolyte. The capacitor also tolerates a greater reverse potential. It may continuously and indefinitely be subjected to a reverse polarity potential of say 10%, whereas the previous tantalum capacitors would tolerate a reverse potential of only 1 or 2%.

In general, the new capacitor approaches the good charcteristics of a mylar or paper capacitor, but the latter are very much bulkier. The present capacitor retains the advantage of the small size of an electrolytic capacitor, without actually using an electrolyte.

The improvement is believed attributable to a combination of several factors. Bulk tantalum wire is too rough and too impure for the present purpose, but the tumbling, polishing and purifying steps result in a greatly improved dielectric layer which is free of pinholes. The use of a very high anodizing potential also improves the dielectric, and makes possible a high rated voltage. The elimination of the manganese dioxide or electrolyte is another important feature of the present improved capacitor. The percautions against heat shock help keep the dielectric film intact.

As so far described the metal wire or core 30 has been assumed to be tantalum, and that metal is greatly preferred. However, another metal may be used if its oxide provides a satisfactory dielectric. Columbium may be used, but relative to tantalum it has the disadvantage of greater leakage. Aluminum may be used, but does not have as high capacitance as tantalum. Titanium may be used, but has even more leakage than columbium. These metals are mentioned because they are anodizable to produce a dielectric surface.

It is believed that my improved manufacture of microminiature capacitors, as well as the advantages thereof, will be apparent from the foregoing detailed description. It will also be apparent that while I have shown and described the invention in a preferred form, changes may be made without departing from the scope of the invention, as sought to be defined in the following claims.

I claim:

1. A small discrete capacitor comprising a metal core made of tantalum, the surface of said core being very smoothly polished and anodized to provide a tantalum pentoxide dielectric, a coating of colloidal graphite applied directly on the oxide, one or more layers of silver on the colloidal graphite, a metal can receiving the aforesaid coated core with solder therebetween, a solderable lead welded to the core, and a solderable lead welded to the can.

2. A small discrete capacitor comprising a metal core made of tantalum, the surface of said core being very smoothly finished and anodized to provide a continuous intact film of tantalum pentoxide dielectric, a coating of colloidal graphite applied directly on the said oxide film, one or more layers of silver on the colloidal graphite, and a metal can receiving the aforesaid coated core with solder therebetween.

3. A capacitor as defined in claim 1 in which a first coating of silver is followed by a coating of colloidal graphite, which is followed by a second coating of silver.

4. In the manufacture of small discrete capacitors, the method which includes taking a wire made of tantalum, tumbling and deburring the wire, sintering the wire in a vacuum at a high temperature to eliminate impurities, electro-polishing the wire to provide a very smooth surface, anodizing the wire to form tantalum pentoxide on the same, applying and baking colloidal graphite directly on the oxide, coating the same with one or more layers of silver, and soldering the same in a can.

5. In the manufacture of small discrete capacitors, the method which includes taking a wire made of tantalum, treating the wire to give it a very smooth surface, anodizing the wire to form a continuous intact film of tantalum pentoxide dielectric on the same, applying and baking colloidal graphite directly on the aforesaid oxide film, coating the same with one or more layers of silver, soldering the same in a can, and baking the assembly.

6. The method defined in claim 5 in which the wire is deburred and is polished to give it a highly polished surface before it is anodized.

7. The method of claim 5 in which a first coating of silver is baked, and is followed by a coating of colloidal graphite, which is followed by a second coating of silver which is baked, said colloidal graphite helping to reduce the heat shock of the soldering operation.

8. The method of claim 5 in which a coating of silver is air dried without being cured, in order to reduce the heat shock of the soldering operation, the assembled unit being baked after the soldering operation to cure the silver.

9. The method of claim 5 in which a coating of silver is only partially cured, in order to reduce the heat shock of the soldering operation, the assembled unit being baked after the soldering operation to complete the curing of the silver.

10. The method of claim 5 in which a first coating of silver is only partially cured, and is followed by a second coating of silver which is air dried without being cured, in order to reduce the heat shock of the soldering operation, the assembled unit being baked after the soldering operation to complete the curing of the silver.

References Cited by the Examiner

UNITED STATES PATENTS

| | | | |
|---|---|---|---|
| 1,906,691 | 5/1933 | Lilienfeld | 317—233 |
| 2,299,228 | 10/1942 | Gray et al. | 317—230 |
| 2,504,178 | 4/1950 | Burnham et al. | 317—230 |
| 2,808,542 | 10/1957 | Vermilyea | 317—230 |
| 3,036,249 | 5/1962 | Hall | 317—230 |
| 3,179,576 | 4/1965 | Huber et al. | 317—230 |
| 3,206,658 | 9/1965 | Markarian | 317—230 |

JOHN W. HUCKERT, *Primary Examiner.*

J. D. KALLAM, *Assistant Examiner.*